Patented May 15, 1923.

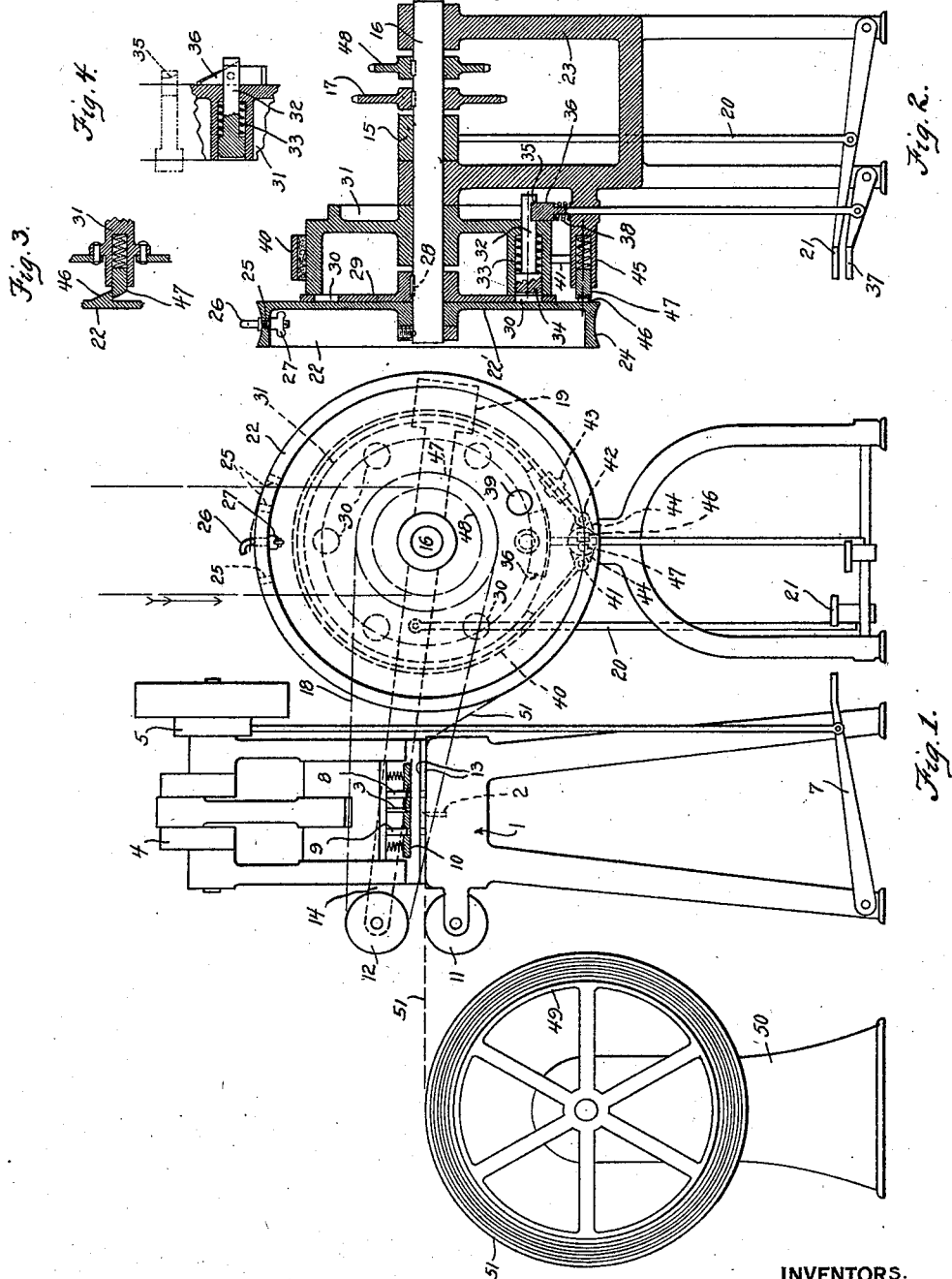

1,455,366

UNITED STATES PATENT OFFICE.

GEORGE TILTON AND ADRIAN O. ABBOTT, JR., OF DETROIT, MICHIGAN, ASSIGNORS TO MORGAN & WRIGHT, A CORPORATION OF MICHIGAN.

CUTTING AND LENGTH-GAUGING MACHINE.

Application filed September 22, 1920. Serial No. 411,916.

*To all whom it may concern:*

Be it known that we, GEORGE TILTON, a citizen of the United States, residing at Detroit, county of Wayne, and State of Michigan, and ADRIAN O. ABBOTT, Jr., a citizen of the United States, residing at Detroit, county of Wayne, and State of Michigan, have invented certain new and useful Improvements in Cutting and Length-Gauging Machines, of which the following is a full, clear, and exact description.

Tire flaps are largely made from laminated strips of rubberized fabric cut on the straight. After being built up, the flaps are cured and desirably in a position approximating that in which they are used. In service they are located between the inner periphery of an inner tube and the beads or toes of a shoe and the rim of the wheel, their function being to prevent pinching the relatively delicate body of the tube. To accomplish the desired shaping, the flaps according to the present practice are cured in more or less circular form and U-shaped in cross section by spirally winding them on a drum or in the groove of a wheel in overlapping convolutions. After curing, the flaps have to be cut to length and preferably also apertured in their opposite ends to receive the valve stem by which they are conveniently held in annular form.

Flaps that have been cured in more or less circular form with or without a transverse curvature have a pronounced tendency to curl or twist when stretched out straight in the direction of their length, and it has not been possible heretofore to cut such circular flaps to length with the required precision and uniformity. To satisfy this shortcoming has been the primary object of the present invention, which comprehends a cutting and gauging mechanism that will enable circularly cured flaps to be cut accurately to length. Generally the invention aims to provide an efficient and easily operated machine that is both durable in construction and rapid in operation. Still further, the invention comprehends an organization and arrangement of parts that will enable an operator to turn out the work with a minimum amount of physical exertion.

Without intent to needlessly limit the scope of the invention, the machine may be briefly described as consisting of shearing mechanism which may be conveniently supplied with the cured flap from one side through an intermittently operable feeding mechanism while at the other side of the shearing mechanism is located a measuring drum for presenting the flap to the blades of the cutter at a predetermined length or distance from the previously cut end. Punches are located at opposite sides and adjacent the blades of the shearing mechanism for simultaneously perforating ends of successively cut flaps.

The preferred embodiment of the invention is illustrated in the accompanying drawings, in which—

Fig. 1 represents the apparatus in front elevation;

Fig. 2 shows the measuring drum in vertical cross section;

Fig. 3 is a detail in cross section of a stop by which the measuring drum is held to accurately gauge the length of the flap cut, and Fig. 4 is another detail of a clutch pin and a member for controlling its operation.

In the drawings at 1 is indicated generally a shearing machine having a stationary or ledger blade 2 with which cooperates a cutting blade 3 which is adapted to be moved in any suitable manner as by the crank mechanism indicated at 4. Through a clutch 5, preferably of the one-revolution type, and its governing treadle 7 the shearing mechanism may be operated at will. Punches 8 and 9 are preferably mounted for movement with the cutting blade 3 and both the punches and the cutting blades may be reciprocated through a yieldingly supported stripping plate 10 in a manner well known.

For intermittently feeding the flap stock, rolls 11 and 12 may be arranged at one side of the shearing mechanism. Preferably but not necessarily the rolls are located on the supply side of the shearing mechanism, roll 11 being fixedly supported below but substantially tangential of a plane through work-supporting surface 13 of the shearing machine, while roll 12 is hung on an arm 14 fulcrumed at 15 intermediate its ends to a shaft 16 which supports the measuring drum. Through a sprocket 17 on shaft 16 and flexible connection such as a chain, indicated diagrammatically at 18, the roll 12 may be driven continuously. The arm 14 is counterbalanced as indicated at 19 so as to normally hold the roll 12 away from the stationary roll 11. Through a rod 20 which is operable by a treadle or foot lever 21, the arm 14 may be turned about the shaft 16 as a fulcrum to bring the driven roll 12 into cooperative feeding relation with the axially fixed roll 11.

On the side of the feeding mechanism opposite the feed rolls 11 and 12 is located a measuring drum or wheel 22 which is loosely mounted on shaft 16 that is journaled in a frame or stand 23. The measuring drum or wheel 22 is provided with a shallow groove 24 in its periphery and with a plurality of apertures 25 for the reception of a hook 26 that is conveniently secured therein by a thumb nut 27.

Contiguous the drum 22 but fixed to the shaft 16 by a key 28 is a disc 29 having a plurality of apertures 30 and constituting the driving member of a clutch. A pulley 31 next to the disc 29 and loose on the shaft 16 carries a coupling pin 32 that is normally urged by a spring 33 in a direction carrying its head 34 against the disc 29. At one end the pin 32 is provided transversely with a slot 35 and when a bevel-ended lug 36 is engaged in this slot the pin is positively prevented from entering any of the holes 30 in the driving disc 29. Disengagement of the lug 36, however, by depression of the treadle 37 against the action of a coil spring 38, frees the pin 32 to the action of its spring 33 and allows it to move into one of the openings 30 and therethrough into a registering hole 39 that is provided in the web 22′ of the measuring drum.

While pulley 31 is loose on shaft 16, it is braked peripherally by the band 40 whose ends 41 and 42 are fixed to ears 44 extending laterally from a lug 45 that is integral or otherwise suitably fixed to the stand 23. By adjustment of the length of the band 40, provided for by the turn buckle 43, more or less constant friction may be opposed to rotation of the pulley 31.

Integral or otherwise suitably fixed to the web 22′ of the measuring drum is a projection 46 that is adapted to cooperate with a spring pressed and bevel-ended detent 47 that is socketed in the before-mentioned lug 45. The projection 46 is located on the drum 22 in such relation to the hook 26 that, when engaged with the detent 47 in the manner shown in Fig. 3, the hook will be at a predetermined distance from the shearing mechanism. The surfaces of the stop 46 and detent 47 are so bevelled that counter-clockwise rotation of the measuring drum 22, as viewed in Fig. 1, is not opposed. But when stop 46 has been moved slightly past detent 47 by such a counter-clockwise rotation, it is impossible to reversely rotate the stop 46 past the detent 47 because of the engagement of their opposed broad faces, and in this relation the parts are shown in Fig. 1.

The shaft 16 of the measuring drum may be driven in any suitable manner, as through the sprocket 48 and the flap stock may be supplied to the machine in any suitable manner as by the cupping reel 49 on a stand 50.

Supposing that a cycle of operations has just been completed, the operator feeds the flap stock 51 through by depressing the treadle 21 to bring the constantly rotated feed wheel 12 into cooperative relation with the roll 11. When the free end of the flap has been projected through far enough to be engaged with the hook 26 that is brought near by turning the drum 22 by hand in a counter-clockwise direction, the treadle 21 is released and the measuring drum rotated by coupling it to the driving member or disc 29. This power rotation is effected by depressing the treadle 37 and releasing the coupling pin 32. As the hook 26 at the end of the preceding cycle of operations occupied substantially the position shown in Fig. 1, and as it has been turned by hand in a counter-clockwise direction to receive the apertured end of the stock, the hole 39 in the web of the measuring drum 22 had necessarily shifted through an angle of say 90°. When, therefore, the coupling pin 32 is released and enters the first presented aperture 30 in the driving disc 29, the pulley 31 moves therewith but not the measuring drum. The latter is not coupled up until the coupling pin 32, comes into register with the aperture 39 and this occurs at a position about 90° from that in which it is shown in Fig. 1. Upon entrance of the coupling pin 32 into the hole 39, however, drum 22 is rotated by power until the hook 26 reaches a position at or slightly beyond that shown in Fig. 1. Then the bevelled end of finger 36 engages in the groove 35 of the coupling pin and automatically disengages the coupling pin from both the web 22′ of the measuring drum and the disc 29. Thus movement of the measuring drum is arrested when the approximate flap length has been drawn from the supply. To present the flap to the action of the shearing mechanism at exactly the desired length from the previously cut end, the stock on the supply side of the shearing mechanism is manually pulled upon. This results in a backward or clockwise rotation of the measuring drum 22 and brings the projection 46 against the spring detent 47 when the stock will be positioned in the path of the cutting blades at precisely the length of the flap desired. In this condition the parts are illustrated in Fig. 1.

Thereupon the treadle 7 is depressed and the stock severed and punched on opposite sides of the blades.

It is to be understood that the invention is not limited to details of construction or the manner of operation of the machine previously described, and for an understanding of the scope of the invention reference should be made to the appended claims.

Having thus described our invention, what we claim and desire to protect by Letters Patent is:

1. In a cutting and gauging machine, in combination, shearing mechanism, a rotatable drum, means on the drum for securing one end of the strip to be cut, and means for holding the drum with the secured end of the strip a predetermined distance from the shearing mechanism.

2. In a cutting and gauging machine, in combination, shearing mechanism, a shaft, a circular drum freely rotatable on said shaft, means for rotating the shaft and coupling the drum thereto, anchoring means on the drum for holding one end of the strip, a strip supply on the side of the shearing mechanism opposite said drum, and means operable when the anchored strip end is pulled upon reversely to gauge the length of strip presented to the action of the shearing mechanism.

3. In a cutting and gauging machine, in combination, shearing mechanism, a shaft, a drum loose on said shaft, a strip end anchoring device on said drum, means for rotating said drum a substantially predetermined distance, and stop mechanism for accurately gauging the position of said strip end anchoring device relative to said shearing mechanism.

4. In a cutting and gauging machine, in combination, shearing mechanism, a shaft, a drum loose on said shaft, a strip-end-anchoring device on said drum, means for rotating said drum a substantially predetermined distance, and a stop mechanism for accurately gauging the position of said strip-end-anchoring device relative to said shearing mechanism, said stop mechanism comprising a projection and a detent one of which is mounted on the drum and the other of which is fixed in the path thereof, said projection and detent being constructed to permit rotation of the drum in one direction only and located at a predetermined point for gauging the length of stock between the shearing mechanism and the strip-end-anchoring device.

5. In a cutting and gauging machine, in combination, shearing mechanism, a shaft, a laterally apertured measuring drum loose on said shaft, stop mechanism including a part on said drum, an apertured disc fixed to said shaft, a pulley loose on said shaft, means frictionally resisting rotation of said pulley, a clutch pin mounted on said pulley and movable into the apertures in said disc and measuring drum, means for actuating said clutch pin, and a stop for holding the measuring drum in a predetermined relation to the shearing mechanism.

6. In a cutting and gauging machine, in combination, intermittently operable feeding mechanism, a measuring drum having means for fastening one end of a strip thereto and operating means therefor, and a shearing mechanism intermediate said feeding mechanism and measuring drum.

7. In a cutting and gauging machine, in combination, shearing mechanism, a substantially circular drum, means on the drum for holding the end of a flap, means for rotating the drum in one direction to pull a predetermined length of the flap from a source of supply and through the shearing mechanism, and means for holding the drum in a predetermined position upon reverse rotation thereof in a direction contrary to that first mentioned.

8. In a cutting and gauging machine, in combination, shearing mechanism including cutting blades and punches on opposite sides of the blades, a rotatable drum, an anchoring device on the drum for one end of a strip and means cooperating with the drum and permitting rotation thereof in one direction but preventing rotation thereof in the opposite direction when the anchoring device is a predetermined distance from the shearing mechanism.

9. In a cutting and gauging machine, in combination, stationary and shiftable feeding rolls, means for driving one of the rolls, means for shifting one of the rolls into cooperative relation with the other, shearing mechanism in line with the feeding rolls, a measuring drum adjacent the shearing mechanism, and means for holding the drum against rotation in one direction with a predetermined length of strip coiled partly thereabout and presented to the blades of the shearing mechanism.

10. In a cutting and gauging machine, in combination, shearing mechanism, a drum, means on the drum for securing one end of a strip thereto, means for rotating the drum, means for automatically arresting rotation of the drum at substantially a predetermined position, and means for accurately locating the drum to present an exact length of strip to the action of the shearing mechanism.

Signed at Detroit, Michigan, this 16th day of September, 1920.

GEORGE TILTON.
ADRIAN O. ABBOTT, Jr.